UNITED STATES PATENT OFFICE.

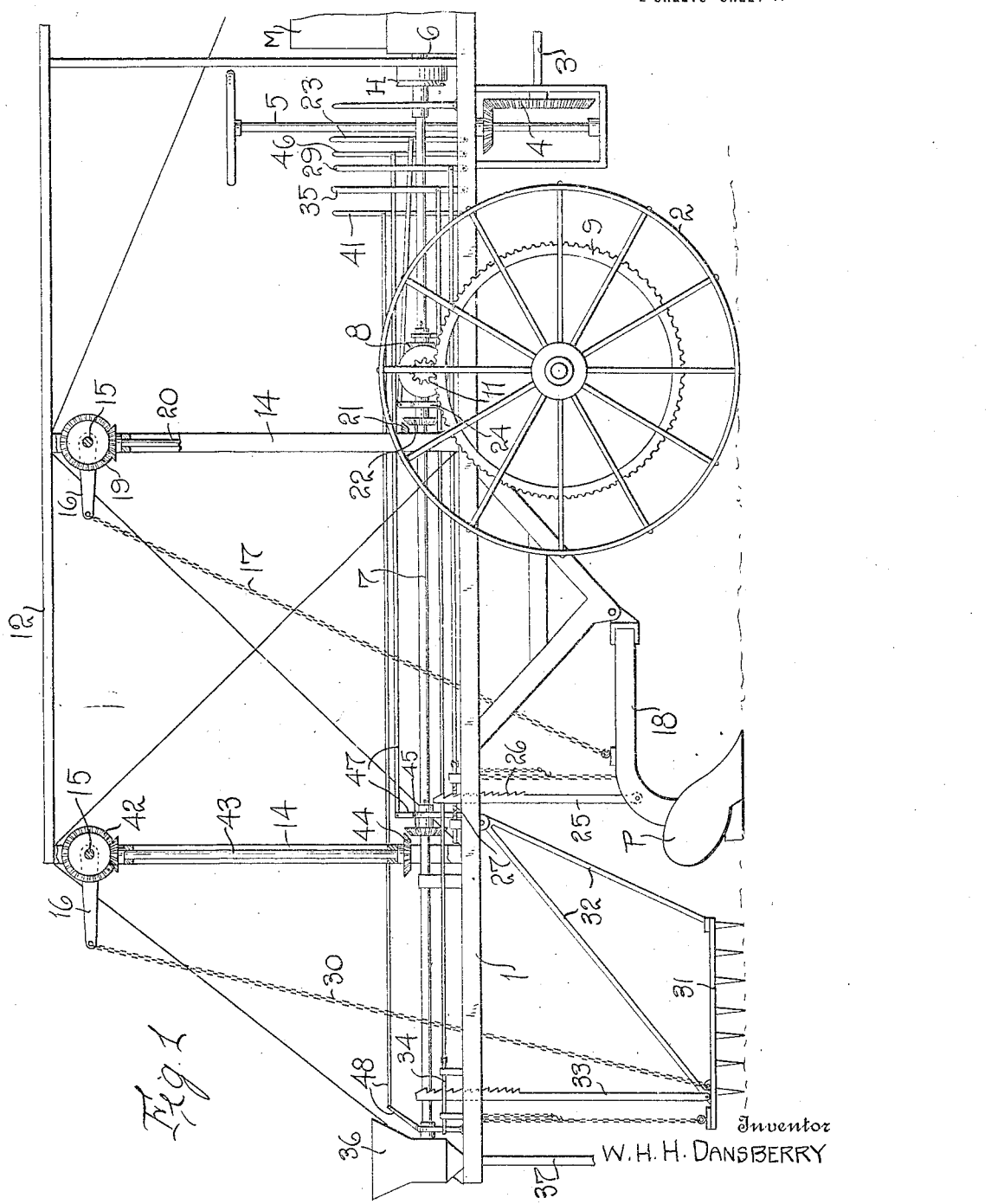

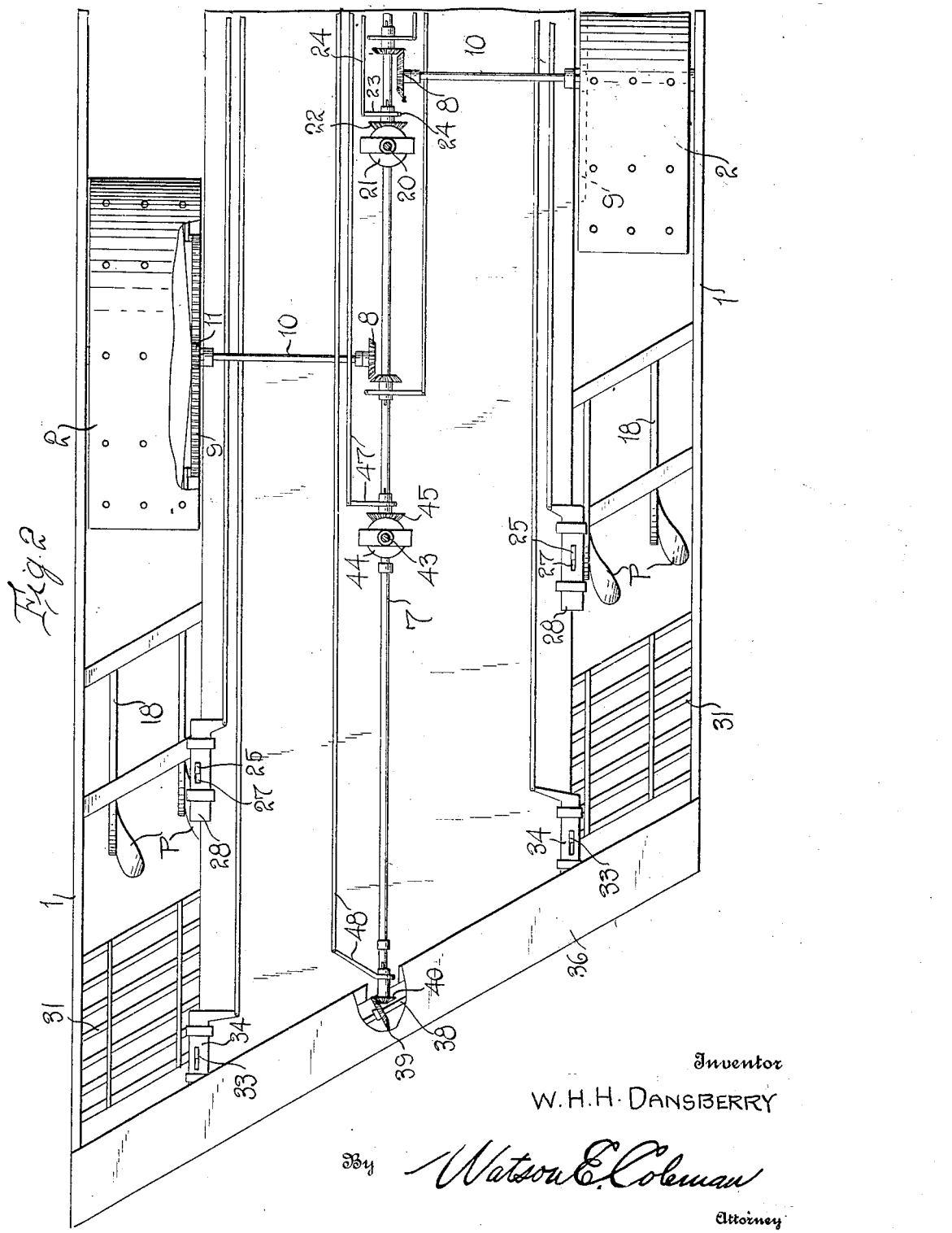

WILLIAM H. H. DANSBERRY, OF LA CROSSE, WISCONSIN.

OPERATING MEANS FOR AGRICULTURAL MACHINES.

1,196,088.  Specification of Letters Patent. Patented Aug. 29, 1916.

Application filed December 20, 1915. Serial No. 67,828.

*To all whom it may concern:*

Be it known that I, WILLIAM H. H. DANSBERRY, a citizen of the United States, residing at La Crosse, in the county of La Crosse and State of Wisconsin, have invented certain new and useful Improvements in Operating Means for Agricultural Machines, of which the following is a specification, reference being had to the accompanying drawings.

This invention relates to certain improvements in agricultural machines, and it is an object of the invention to provide a machine of this general character including a plurality of devices having novel and improved means whereby each of the devices may be rendered operative or inoperative independently of the remainder of the devices.

Furthermore, it is an object of the invention to provide an agricultural machine having novel and improved means whereby the traction wheels and the several working devices carried thereby are operated from a common source of power.

The invention consists in the details of construction and in the combination and arrangement of the several parts of my improved agricultural machine whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in side elevation, with parts broken away, of an agricultural machine constructed in accordance with an embodiment of my invention, said view being somewhat diagrammatic for clarity of disclosure; and Fig. 2 is a view in top plan of the machine as herein disclosed.

As disclosed in the accompanying drawings, 1 denotes a frame having its rear portion supported by the traction wheels 2 arranged in parallel planes disposed transversely of the frame 1. The forward portion of the frame is adapted to be supported through the medium of conventional steering wheels but as this part of the device forms no essential feature of my present invention, it is thought that a detailed description or illustration thereof is unnecessary other than to state that the shaft 3 is included in the steering mechanism for said wheels and is operatively engaged, as at 4, with the steering column 5.

Suitably supported by the forward portion of the frame 1 is the motor M preferably of an internal combustion type and having the driving shaft 6 thereof adapted for connection with the driven shaft 7 through the medium of the clutch mechanism H which may be of any conventional type.

The driven shaft 7 is disposed longitudinally of the frame 1 substantially midway thereof and is operatively engaged, as at 8, with the oppositely directed transverse shafts 10 which are also operatively engaged, as at 11, with the gear wheels 9 affixed to the traction wheels 2 at the inner faces thereof.

The frame 1 is also provided with the super-structure 12 including the transversely alined uprights 14 having rotatably supported adjacent the upper ends thereof the shafts 15 from which extend the rearwardly disposed rock arm 16. The rock arms 16 of the forward shaft 15 are operatively connected through the medium of the flexible members 17 with the plow frame 18 pivotally engaged with the frame 1 and capable of rocking movement in a vertical direction. The forward shaft 15 has also fixed thereto the beveled gear 19 operatively engaged with the vertically disposed shaft 20 rotatably supported by the super-structure 12 and the lower extremity of said vertical shaft is provided with a beveled gear 21 adapted to be engaged by the beveled gear 22 keyed to but capable of sliding movement longitudinally of the driven shaft 7.

23 indicates a lever operatively engaged, as at 24, with the gear 22 whereby it will be perceived that the gears 22 and 21 may be brought into mesh in order to impart upward swinging movement to the arms 16 in order to lift the plow supporting frame so as to adjust the plows P carried thereby into an inoperative position.

The plow frame 18 has pivotally engaged with its rear or free end portion the substantially vertically disposed rack bars 25 with the teeth 26 disposed along the forward longitudinal faces thereof and, said bars are directed through the longitudinally disposed openings 27 formed in the slides 28 carried by the frame 1, said slides being reciprocated through the medium of the lever 29. When the slide 28 is in rearward adjustment, it will be perceived that the teeth 26 of the rack bars coact therewith to maintain the plow frame 18 in an elevated position but when the slides 26 are moved forward, the plow frame will fall by gravity.

The arms 16 of the rear shaft 15 are operatively engaged through the medium of the flexible connection 30 with the vertically movable drag 31, said drag including an upstanding frame 32 pivotally engaged with the under portion of the frame 1. The drag is provided with the rack bars 33 of a construction similar to the rack bars 25 and coacting with the slides 34 operating in the same manner as has been described relative to the slides 28, said slides 34 being under control of the lever 35.

The rear shaft 15 has affixed thereto the beveled gear 42 operatively engaged with the vertically disposed shaft 43 rotatably supported by the super-structure 12 and the lower extremity of the shaft 43 is provided with the beveled gear 44 adapted to be engaged by the beveled gear 45 keyed to but capable of slidable movement longitudinally of the driven shaft 7.

46 denotes a lever operatively engaged, as at 47, with the gear 45 whereby it will be perceived that the gears 44 and 45 may be brought in mesh in order to impart upward swinging movement to the arms 16 of the rear shaft 15 in order to lift the drag so as to adjust said drag into an inoperative position.

The rear portion of the frame 1 has disposed transversely thereof the seed hopper 36 from which depend the shoes 37 and within the seed hopper is the distributing shaft 38 of conventional construction and said shaft is provided with the gear 39 adapted to be engaged by the gear 40 keyed to the driven shaft 7 but capable of movement longitudinally thereof through the medium of the lever 41 operatively engaged, as at 48, with the gear 40.

It will be observed that the operating levers for the various devices are so positioned as to be readily reached by the operator of the device.

From the foregoing description, it is thought to be obvious that an agricultural machine constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a frame, and a member supported by the frame and mounted for movement in a vertical path, a driven shaft supported by the frame, an upright carried by the frame, a shaft rotatably supported by the upright, a vertical shaft operatively engaged with the last named shaft, means carried by the first named shaft adjustable into or out of engagement with the vertical shaft whereby the second named shaft is caused to rotate, a rock arm carried by the second named shaft, and a flexible connection between the rock arm and the member whereby said member is elevated upon rotation of the second named shaft under the influence of the first named shaft.

2. In combination with a frame, and a member supported by the frame and mounted for movement in a vertical path, a driven shaft supported by the frame, an upright carried by the frame, a shaft rotatably supported by the upright, a vertical shaft operatively engaged with the last named shaft, means carried by the first named shaft adjustable into or out of engagement with the vertical shaft whereby the second named shaft is caused to rotate, a rock arm carried by the second named shaft, a flexible connection between the rock arm and the member whereby said member is elevated upon rotation of the second named shaft under the influence of the first named shaft, and releasable means for maintaining the member elevated.

3. In combination with a frame, and a member supported by the frame and mounted for movement in a vertical path, a driven shaft supported by the frame, an upright carried by the frame, a shaft rotatably supported by the upright, a vertical shaft operatively engaged with the last named shaft, means carried by the first named shaft adjustable into or out of engagement with the vertical shaft whereby the second named shaft is caused to rotate, a rock arm carried by the second named shaft, a flexible connection between the rock arm and the member whereby said member is elevated upon rotation of the second named shaft under the influence of the first named shaft, said member being movable in an opposite direction by gravity, and a second flexible connection interposed between the member and the frame for limiting the downward movement of the member.

In testimony whereof I hereunto affix my signature in the presence of two witnesses.

WILLIAM H. H. DANSBERRY.

Witnesses:
 JAMES THOMPSON,
 CARRIE JOHNSTON.